United States Patent Office 3,515,540
Patented June 2, 1970

3,515,540
MIXED COBALT/TUNGSTEN CARBIDE POWDERS
Geoffrey W. Meadows, Kennett Square, Pa., assignor to E. I. du Pont de Nemours and Company, Wilmington, Del., a corporation of Delaware
No Drawing. Continuation-in-part of application Ser. No. 660,986, Aug. 16, 1967. This application June 4, 1969, Ser. No. 830,532
Int. Cl. C22c 29/00
U.S. Cl. 75—.5     16 Claims

ABSTRACT OF THE DISCLOSURE

Powder mixtures of tungsten carbide and from 1 to 30 percent by weight of tungsten-cobalt alloy, are useful in preparing tungsten carbide cutting tools or bits for cutting or shaping very hard materials. The powder mixtures are characterized by having a specific surface area greater than 0.1 square meter per gram, and tungsten-cobalt alloy containing from 8 to 33 percent by weight of tungsten.

Cross-reference to related applications

This application is a continuation-in-part divisional of my copending application Ser. No. 660,986, filed Aug. 16, 1967, now Pat. No. 3,451,791, which in turn was a continuation-in-part of my then copending application Ser. No. 582,924, filed Sept. 29, 1966 now abandoned, and my then copending application Ser. No. 516,825, filed Nov. 24, 1965 now abandoned. My copending application Ser. No. 582,924 was a continuation-in-part of my copending application Ser. No. 516,825 and both of these were continuations-in-part of my application Ser. No. 418,808, filed Dec. 16, 1964, now abandoned.

Background of the invention

This invention relates to powder mixtures of tungsten carbide and tungsten-cobalt alloy and to methods of preparing them.

The products of this invention will often be referred to herein as cobalt/tungsten carbide powders, a term commonly employed to describe a well-known class of compositions, but it will be understood that the cobalt contains appreciable amounts of tungsten and is thus in reality a tungsten-cobalt alloy.

It has been generally accepted, by those skilled in the art of dense cobalt-bonded tungsten carbide bodies, that it is not possible to achieve maximum hardness and maximum strength and toughness simultaneously in a single dense composition. It was commonly recognized that for greatest hardness the dense composition should contain a minimum of cobalt binder and have the finest tungsten carbide grain size. Conversely for greatest strength and toughness the dense composition should contain large amounts of cobalt. See Cemented Carbides by Schwartzkopf and Kiefer, Macmillan Co., 1960, page 137. Tungsten carbide grain size and cobalt content were the only two variables known to effect marked property changes in such dense compositions. See American Machinest, vol. 105 (12), p. 95.

More recently a further variable, the composition of the metal phase in dense compositions has come under study. H. Kubota, R. Ishida and A. Hara in Indian Institute of Metals, Transactions, vol. 9, pp. 132–138 (1964) pointed out that when tungsten carbide grain size is not very fine and when the carbon to tungsten atomic ratio is below theoretical, as much as 10% tungsten can be present in solid solution in the cobalt phase of dense compositions. Increased tungsten in the cobalt was correlated with increased transverse rupture strength, hardness, and fatigue strength of dense compositions containing high cobalt levels.

However, it was further substantiated by H. Kubota along with H. Suzuki that if the tungsten carbide grain size was smaller than 2 microns the presence of tungsten in the cobalt corresponds to a decrease in the strength of the dense compositions. See Planseeherichte für Pulver Metallurgie, vol. 14, No. 2, pp. 96–109 August (1966). That a tungsten carbide grain size of 2 microns is optimum for dense compositions is reported by others such as J. Gurland and P. Bardzil, Journal of Metals, February 1955, pp. 311–315.

I have discovered however that dense cobalt-bonded tungsten carbide compositions prepared from the powder mixtures of this invention have an outstanding combination of hardness, strength and toughness. The dense bonded compositions prepared from the powders of this invention have a very fine tungsten carbide grain size with the mean grain size smaller than one micron and at least 60% of the grains smaller than one micron in diameter. These dense bonded compositions also contain at least 8 percent by weight of tungsten in the cobalt phase and demonstrate a high resistance to removal of the metal binder with concentrated hydrochloric acid. The mixed powders of this invention are generally characterized as containing from 1 to 30 percent by weight of tungsten-cobalt alloy which in turn contains from 8 to 33 percent by weight of tungsten. The mixed powder has a specific surface area greater than 0.1 square meter per gram.

Summary

In summary this invention relates to cobalt/tungsten carbide powder mixtures and is more particularly directed to cobalt/tungsten carbide powders in which the mixed powder has a specific surface area greater than 0.1 square meter per gram; the tungsten-cobalt alloy contains from 8 to 33 percent by weight of tungsten; and the powder contains 1 to 30 percent by weight of tungsten-cobalt alloy. This invention is further directed to methods of preparing the powder mixtures which are useful in fabricating dense cobalt-bonded tungsten carbide cutting tools.

The bonded compositions prepared from the powders of this invention combine surprisingly high transverse rupture strength and toughness with extreme hardness and acid resistance to provide refractory materials of exceptional utility for cutting, drilling, shaping, punching or otherwise working very tough hard materials. These bonded compositions are more fully described in my application Ser. No. 660,986 referred to above.

Description of the invention

The principal aspect of this invention is a cobalt/tungsten carbide powder mixture in which there is from 1 to 30 percent by weight of tungsten-cobalt alloy; the tungsten-cobalt alloy contains from 8 to 33 percent by weight of tungsten; and the tungsten carbide has a specific surface area of more than 0.1 and preferably more than 0.5 square meter per gram.

A further aspect of this invention is a powder mixture of tungsten-cobalt alloy with anisodimensional tungsten carbide particles having a longest dimension of from 0.1 to 50 microns and a shortest dimension which is less than ⅓ that of the longest dimension.

A further aspect of this invention is a heat-treated cobalt/tungsten carbide powder mixture of 1 to 30 percent by weight cobalt alloyed with 8 to 33 percent by weight tungsten, the specific surface area of tungsten carbide being greater than 0.1 square meter per gram.

A further aspect of this invention is a process for preparing the above compositions. This process comprises intimately mixing finely divided cobalt or tungsten-cobalt alloy with a uniformly fine tungsten carbide powder. The tungsten carbide powder should have a particle size of less than 1000 millimicrons and a specific surface area of 3 to 15 square meters per gram and should contain between 0.81 and 1.0 atomic weights of carbon per atomic weight of tungsten. After the cobalt and tungsten carbide powder is homogeneously intermixed it can be heat treated at a temperature above 1000° C. in an inert atmosphere. This process is also applicable to powder mixtures containing anisodimensional tungsten carbide.

The cobalt/tungsten carbide powder mixtures of this invention are referred to from time to time as interdispersions. This term is meant to describe a relationship of cobalt and tungsten carbide which includes traditional mixtures in which both phases are particulate or interrupted and homogeneously intermixed.

STARTING MATERIALS

The starting materials suitable for use in this invention are tungsten carbide and cobalt which have a requisite degree of purity and a sufficiently fine particle size to produce the products of this invention as pointed out below.

(1) Tungsten carbide

The tungsten carbide suitable for use in this invention is a finely divided composition containing tungsten and carbon in a ratio corresponding to from 0.81 to about 1.0 atomic weight of carbon per atomic weight of tungsten and which can contain tungsten monocarbide and ditungsten carbide along with metallic tungsten or suitable materials serving as a subsequent source of metallic tungsten, such as a cobalt-tungsten alloy powder. Such powders can be reduced in particle size by grinding to disaggregated, discrete particles substantially all of which have a particle size smaller than one micron.

Commercially available tungsten carbide is generally prepared at high temperature and then ground to obtain a powder. In some instances the particles are as small as a micron in diameter. The finest tungsten carbide powders of commerce have a specific surface area of from 0.1 to 1.0 square meter per gram. Microscopic examination of such powders shows most of the material in the form of particles ranging from one to 50 microns in diameter, with a minor weight fraction of finer material which contributes disproportionately to the specific surface area.

By prolonged ballmilling of tungsten carbide powders, in which most of the particles are initially smaller than a few microns, in a fluid medium such as acetone or alcohol, it is possible to convert a portion of the tungsten carbide to particles less than 100 millimicrons in size. Such prolonged milling results in a wide distribution of sizes of particles which range from less than 10 to 1000 or more millimicrons in diameter. From this material, a fraction of colloidal size consisting of particles ranging in size from more than 10 to less than 100 millimicrons in size can be separated by controlled sedimentation. Such finely divided tungsten carbide is characterized by its freedom from coherent aggregates and by a range of particle sizes.

A suitable commercial tungsten carbide with a stoichiometric ratio of carbon to tungsten and a relatively uniform ultimate particle size of about 1 micron is Type 1 tungsten carbide sold by the Wah Chang Corporation. When ballmilled in acetone for from three days to a week by methods described hereinafter, this material provides a finely divided tungsten carbide having an average grain size of 0.1 to 0.2 micron with a specific surface area of 2 to 5 square meters per gram. This product can then be further milled in acetone with cobalt powder for several days and dried out of contact with air to give an interspersed cobalt/tungsten carbide powder which has a carbon to tungsten atomic ratio of between 0.99 and 1.0, some carbon having been lost in the milling and drying process.

Another suitable starting material is finely divided tungsten carbide consisting of colloidal particles admixed with a minor proportion of supercolloidal particles up to five microns in diameter.

Such heterogeneous mixtures of colloidal and supercolloidal particles of tungsten carbide are prepared, for example, by prolonged ballmilling of a commercial tungsten carbide powder of initial particle size ranging from 0.5 to 5 microns and a specific surface area of about 0.5 square meter per gram, in an organic liquid medium such as acetone. Preferred grinding materials are hard balls or cylinders from 0.1 to 0.3 inch in diameter, made of dense cobalt-bonded tungsten carbide containing, for example, from 90 to 95% tungsten carbide and 10 to 5% by weight of cobalt. Milling of the heterogeneous mixture is continued until, without separating the colloidal fraction, the milled material has a specific surface area of at least 3 square meters per gram, although the mixture can still contain a proportion of tungsten carbide particles up to five microns in diameter. It is essential that the proportion of crystals larger than one micron remaining after milling is not too large, since during sintering and hot pressing of the resulting powder these crystals serve as nuclei which grow at the expense of the colloidal fraction to produce an undesirably coarse-structured, weak body. Generally speaking, to prepare colloidal tungsten carbide from commercial tungsten carbide powder for use in the present invention, it is necessary to mill the powder in a liquid medium until the specific surface area of the mixture is at least 3 square meters per gram and preferably until no more than 5 percent by weight of the milled material is larger than five microns. Most preferably, milling is continued until most of the particles are smaller than one micron.

A preferred tungsten carbide starting material for this invention is that disclosed in copending application Ser. No. 772,810, filed Dec. 11, 1968. This tungsten carbide is in the form of crystallites of colloidal size, well under half a micron in diameter and typically 30 or 40 millimicrons in diameter, the crystallites being linked together in porous aggregates. It is prepared by forming and precipitating tungsten carbide from a reaction medium of molten salt. Such powder, after purification, consists of crystallites of uniform size, greater than 90% of them being between 10 and 60 millimicrons in diameter. The packing density of this powder is about 6 grams per cc. The crystallites are linked together into aggregates consisting of three dimensional porous networks which are friable and permit the tungsten carbide crystallites to be readily broken apart by milling or grinding. Such grinding will produce fine fragments of the aggregates as well as discrete crystallites, of colloidal dimensions, with a packing density of about 9 g./cc. This disaggregated tungsten carbide is characterized by a specific surface area of from 3 to 15 square meters per gram and consists predominantly of ultimate crystals ranging from 10 to 60 millimicrons. Some of the crystallites are still linked as aggregates at this point but all such aggregates are less than half a micron in average diameter, and usually contain only a few crystallites of tungsten carbide. Such starting material produces anisodimensional tungsten carbide grains in dense bodies prepared under conditions set out hereinafter.

The packing density of these powders can be determined by the following procedure: About 15 grams of tungsten carbide powder is passed through a screen of 45 meshes per inch and loaded into a 0.5 inch diameter cylindrical cavity of a steel die fitted with two close-fitting, flat-ended steel pistons, one of which is inserted after the powder is loaded. The internal surface of the die and the surface of the pistons are previously lubricated by applying to them a 3% solution of stearic acid in carbon tetrachloride and permitting the solvent to evaporate. The powder is compacted in the die with sufficient pressure to apply a load of 9 tons per square inch on the powder. The pressure is maintained for one minute, then gently released over a period of 15 seconds. The compacted pellet is pushed from the die, weighed to the nearest hundredth of a gram and the height and diameter measured to the nearest thousandth of an inch. The packed density is calculated directly from the weight and dimensions of the pellet and expressed in grams per cubic centimeter.

Anisodimensional tungsten carbide platelets are formed when very finely divided, very uniformly divided tungsten monocarbide powder, free from larger particles which may serve as nuclei for crystal growth, is heated to bring about recrystallization. The temperature required depends on the initial size of the tungsten carbide crystals and the amount of cobalt or other metal that is present. When essentially all the crystals of tungsten carbide in the starting powder are less than about 0.5 micron in diameter, and preferably when 90% of the crystals are between 10 and 60 millimicrons, recrystallization at high temperature results in the formation of platelets or other anisodimensional shapes of crystals. But if an appreciable amount of the starting tungsten carbide powder, such as 1 to 5% consists of crystals or fragments of crystals appreciably larger than the average size, such as those ordinarily obtained by grinding commercial tungsten carbide powder, then at high temperature, recrystallization occurs in such a way that the larger crystals grow as the smaller ones disappear, and since such larger crystals are not initially anisodimensional they grow more or less uniformly in all directions without becoming anisodimensional.

To obtain anisodimensional tungsten carbide platelets, it is thus preferred that the starting powder of tungsten carbide have a unimodal size distribution and contain less than 5 percent by number of crystals larger than 1 micron and most preferably less than 1 percent by number of crystals 0.5 micron or larger in size. The preparation and characterization of anisodimensional tungsten carbide platelets is fully described in my copending application Ser. No. 660,986, referred to above.

The composition of tungsten carbide powder can be established by the ordinary analytical procedures for tungsten, carbon and oxygen. It is desirable for the purposes of this invention that the oxygen content of the dried powder be as low as possible, preferably lower than 0.5%, and that the combined carbon content should correspond to from about 80 to just slightly less than 100 percent of the theoretical value for tungsten carbide WC, of 6.12% carbon by weight. Powders having a carbon content of as low as 81% of theoretical for WC, can be used with an amount of 30% by weight of cobalt binder, but if less cobalt is employed, powders less deficient in carbon are much preferred. It is also important that essentially all the carbon be combined in the tungsten carbide lattice; no more than 0.3 percent and preferably less than 0.1% uncombined carbon should be present in the powder. Under some circumstances it is possible to include larger amounts of free carbon in the starting powder, but this increases the probability of leaving unreacted free carbon in the product, which is undesirable. The total carbon content ordinarily should not be so high as to cause the carbon content in the final composition with cobalt to exceed that theoretically required for the WC content.

The uncombined carbon content or free carbon content of tungsten carbide can be determined by dissolving the tungsten carbide in a 1:3 mixture of nitric and hydrofluoric acids which oxidizes and dissolves the tungsten carbide but does not attack the free carbon. The solution can then be diluted and filtered through a Gooch crucible which is then washed, dried, and weighed. After weighing the crucible it is fired to remove the carbon and is then weighed again. The loss in weight on firing, after correction for any standard blank loss, is the weight of free carbon in the tungsten carbide sample. Alternatively the carbon is burned and the carbon dioxide is determined.

The particle size can be determined by any of the methods familiar to the art. Thus in characterizing the tungsten carbide powders of this invention, the number average particle size can be determined by direct observation of electron micrographs. It can also be calculated from the specific surface area as determined by nitrogen adsorption data as described in "A New Method for Measuring the Surface Area of Finely Divided Materials and for Determining the Size of the Particles," by P. H. Emmett in "Symposium on New Methods for Particle Size Determination and the Subsieve Range," Philadelphia; American Society for Testing Materials, 1941, p. 95.

The various tungsten carbide particles involved in this invention are microcrystalline and are readily characterized by X-ray diffraction analysis of the powders. Methods of characterizing such particles are fully explained in copending application Ser. No. 250,442, referred to above.

An estimation of particle shape can also be made by the X-ray diffraction method as described by J. Jirgensons and M. E. Straumanis in "A Short Textbook of Colloid Chemistry," second revised edition, published by the MacMillan Company, New York, 1962, page 256.

An estimate of crystallite size can be calculated from the line broadening of the X-ray diffraction lines as described by B. D. Cullity in "Elements of X-ray Diffraction," Addison-Wesley Publishing Co., Inc., Reading, Mass., 1959, pages 261 to 263.

The average crystallite size as determined by X-ray line broadening of the diffraction lines is less than the average diameter calculated from nitrogen surface area measurements and the magnitude of the difference is directly related to the degree of aggregation of the ultimate crystals. The more extensive the aggregation, that is the larger the number of intercrystalline bonds, the less surface available for nitrogen adsorption.

The nature and size of the colloidal tungsten carbide aggregates and anisodimensional grains is also ascertained directly by observation of electron micrographs for purposes of characterization, and can also be determined by sedimentation techniques.

(2) Cobalt

Cobalt suitable for use in this invention includes any source of cobalt metal which can be used to prepare an interdispersion of cobalt with tungsten carbide powder. Thus a form of cobalt readily suited for use in this invention is cobalt metal in the form of a finely divided powder which can, if desired, be further reduced in size by ballmilling with the tungsten carbide. Commercially available metal powders such as "Cobalt F" sold by the Welded Carbide Tool Co. are suitable. The metal to be used should be of high purity, preferably more than 99.5% pure cobalt, and should be free from any of the impurities known to be harmful to the properties of cemented tungsten carbide.

The amount of tungsten-cobalt alloy present in the powder mixtures, as previously stated, ranges from about 1% to about 30% by weight, a preferred amount of alloy being from 3 to 30% by weight. Such amounts provide very desirable properties in subsequent dense compositions for cutting or forming metals such as steel.

A particularly preferred amount of tungsten-cobalt alloy in the powder mixtures of this invention is from about 3 to about 15% by weight based on the total weight of the powder composition. Dense bodies prepared from such compositions have a very desirable combination of strength, hardness and toughness and display great strength for a given hardness as compared to commercial cemented carbides.

Powder mixtures of this invention containing an amount of tungsten-cobalt alloy of from 1% to 3% are also preferred mixtures as they form dense bodies possessing exceptional chemical and wear resistance as well as unusual hardness and strength for compositions with such a low cobalt level.

Powder mixtures containing from about 15 to about 30% by weight of tungsten-cobalt alloy are also preferred as they form dense bodies which have high hardness and toughness making them very desirable for special uses where they are subject to impact as in dies.

Another preferred embodiment of this invention is a powder mixture containing from about 8 to 15% by weight of tungsten cobalt alloy. Such mixtures form dense bodies which possess an outstanding combination of high temperature strength and hardness which makes them very useful for cutting tool bits and other refractory uses at temperatures where hardened steel alloys lose strength and hardness.

The most preferred amounts of tungsten-cobalt alloy in mixtures of this invention is from 9 to 12% by weight. Such mixtures form dense bodies which demonstrate the greatest combination of strength and hardness and are most useful as cutting tool bits.

PREPARATION OF POWDER MIXTURES

(1) Methods of mixing the raw materials

The cobalt and tungsten carbide suitable for use in this invention must be intimately and homogeneously intermixed to form what I term the cobalt/tungsten carbide powder mixtures.

In order to distribute cobalt homogeneously throughout tungsten carbide, extensive ballmilling is ordinarily employed.

For interdispersions containing only one or two percent cobalt, colloidal, milled tungsten carbide can also be interdispersed with cobalt by dispersing the tungsten carbide in a suitable fluid such as normal propyl alcohol, and mixing the dispersion with a dilute solution of a salt of the cobalt to be incorporated such as an alcoholic solution of cobalt acetate. Adsorption of the cobalt ions causes aggregation of the dispersed tungsten carbide, which can then be readily recovered and dried. Throughout the milling, purification, incorporation of the cobalt, recovery and drying, air should be excluded from the compositions of this invention by maintaining an inert atmosphere of nitrogen or argon in the equipment. Following the above steps the mixture is reduced in hydrogen.

Another suitable method of interdispersion is that disclosed in my copending application Ser. No. 629,428 filed Apr. 10, 1967.

Preparation of compositions containing more than 1% cobalt is best accomplished by milling fine tungsten carbide powder, preferably consisting of ultimate particles having an average diameter of less than 100 millimicrons, with a suitable cobalt powder in a liquid medium. It is preferred to use a mill and grinding material from which a negligible amount of metal is removed. It is generally preferred to use ballmills or similar rotating or vibrating mills. Suitable materials of construction for such mills are steel, stainless steel, nickel, or nickel-steel alloys. Mills plated on the inside with nickel or lined with cobalt-bonded tungsten carbide, are also satisfactory. The grinding medium which is more susceptible to wear than the mill itself, should be of a hard, wear-resistant material such as a metal-bonded tungsten carbide. Cobalt-bonded tungsten carbide containing about 6% cobalt is preferred. This can be in such forms as balls or short cylindrical rods about one-eighth to one-quarter inch in diameter, which have been previously conditioned by running in a mill in a liquid medium for several weeks until the rate of wear is less than .01% loss in weight per day. Mill loadings and rotational speeds should be optimized as will be apparent to those skilled in the art. However, the proportion of charge to milling medium is preferably low, as illustrated in the examples which follow.

In order to avoid caking of the solids on the side of the mill, a sufficient amount of an inert liquid medium is ordinarily used to give a thin slurry with the tungsten carbide powder charged to the mill. It is preferred to use non-aqueous liquids which are inert toward the highly reactive surface of the colloidal particles. A liquid medium which is suitable for this purpose is acetone.

Ballmilling tungsten carbide in the presence of cobalt reduces the particle size of the tungsten carbide and distributes the cobalt uniformly among the fine particles of carbide. However, when more than two or three percent cobalt is present in the mixture it tends to minimize the attrition of the tungsten carbide. Thus, when higher cobalt levels are desired and it is necessary to reduce the particle size of the tungsten carbide, it is preferred to mill the tungsten carbide separately prior to interspering the carbide with cobalt. Accordingly, to produce a milled mixture of tungsten carbide and cobalt in which essentially all of the tungsten carbide particles are smaller than about one micron and the tungsten carbide has a specific surface area of greater than three square meters per gram, it is preferred to start with tungsten carbide particles no larger than about ½ to 5 microns and whose specific surface area is at least 0.1 square meter per gram, and preferably at least 0.5 square meter per gram. It is most advantageous to start with the preferred colloidal tungsten carbide disclosed in copending application Ser. No. 772,810 since it is not necessary to mill that tungsten carbide before it is milled with cobalt.

The carbon content can be adjusted to within the desired range by the addition of suitable amounts of finely divided tungsten, ditungsten carbide or carbon to the mill, as will be evident to one skilled in the art. For example, in certain instances where the tungsten carbide is not sufficiently deficient in carbon or contains a small amount of free carbon, it is necessary to produce a carbon deficiency in the composition by adding a small amount of suitable material that will combine with carbon yet not leave an undesirable carbide in the product. Thus finely divided tungsten powder, preferably a micron or finer in particle size, can be added to the composition before milling. If only a small carbon deficiency such as an atomic ratio of carbon to tungsten of 0.99 or 0.97 is to be created, small amounts of other metals such as tantalum, niobium, zirconium or titanium can be used instead, but in determining the carbon to tungsten ratio in the final composition, the presence of small amounts of such added metals or their carbides must be taken into account in the analysis. The addition of such other metals to create an overall carbon deficiency is an alternative to the addition of tungsten in producing the products of this invention. Of such other metals, tantalum is preferred because its carbide acts as a grain growth inhibitor and enhances hardness at high temperatures. For compositions in which the carbon content is outside the desired range, batches may be blended, preferably in the mill, to achieve the desired composition.

Milling of cobalt/tungsten carbide mixtures is continued until the cobalt is homogeneously interdispersed with the finely divided tungsten carbide; most of the tungsten carbide is present as particles smaller than one micron; and the tungsten carbide has a specific surface area of at least 3 square meters per gram. The tungsten carbide can be analyzed and characterized by dissolving the metal with hydrochloric acid, and washing and drying the tungsten carbide powder. Homogeneous interdispersion is evidenced by the fact that it is essentially impossible to separate the cobalt from the tungsten carbide by physical means such as sedimentation or a magnetic field.

The mill is ordinarily fitted with suitable attachments to enable it to be discharged by pressurizing it with an inert gas. The grinding material can be retainend in the mill by means of a suitable screen over the exit port. The liquid medium is separated from the milled powder such as by distillation and the powder is then dried under vacuum. Alternatively the solvent can be distilled off directly from the mill. The dry powder is then crushed and screened, while maintaining an oxygen-free atmosphere such as a vacuum, nitrogen or argon. It should be understood that the term inert atmosphere includes a vacuum or space filled with inert gas at low absolute pressure.

As the powder is being dried it goes through a sticky condition at which point it can be extruded or pelleted if desired. Formation of fine spherical pellets occurs if the slightly moist powder is passed through a 60 mesh screen and is gently shaken or rolled. A preferred form of powder made in this way consists of fairly uniform, spherical aggregates from 20 to 200 microns in diameter, depending on the forming conditions. These remain coherent even without addition of a binder or lubricant.

It should be noted that the very fine powder used in this invention contains components in a substantially colloidal state of subdivision and is much more reactive toward oxygen than coarser tungsten carbide powders which are milled with cobalt under the same conditions. Thus milled compositions of the prior art are generally handled in the air without becoming hot or burning and are not seriously contaminated by exposure to the atmosphere. While the powders dried from the milled mixtures of the present invention do not alway ignite spontaneously when exposed to air, they nevertheless rapidly absorb oxygen and form oxides.

When such powders are heated, the oxides react with tungsten carbide to form carbon monoxide which is evolved, leaving the composition with a lower atomic ratio of carbon to tungsten. Excessive oxidation can thus lead to excessive loss of carbon and produce bodies in which most of the cobalt is no longer present as metallic binder, but as the brittle eta phase, $Co_3W_3C$.

In one of the preferred processes of this invention, the dry powder recovered from the milling process is kept out of contact with the atmosphere and is subjected to the further process steps without a reduction of carburization treatment. This can be done only when the milled powder is sufficiently low in oxygen, ordinarily less than one percent by weight, has the desired content of combined carbon, and contains no appreciable amount of free carbon, so that a densified composition prepared therefrom contains less than 1.0 atomic weight of carbon per atomic weight of tungsten. To prepare dense products with most homogeneous structures, there should be no more than 0.3 percent by weight of free carbon in the powder, and less than 0.1 percent is preferred.

It is sometimes advantageous to degas the dried milled powder, removing volatile materials by heating the loose powder in an inert atmosphere, preferably a vacuum, at from 400 to 700° C. At these temperatures there is essentially no sintering and the subsequently cooled powder remains soft and easily compacted under pressure. This is a desirable step when the powder is to be isostatically compacted and then sintered, so as to avoid disruption of the compact by gas evolution during sintering.

In the preferred powder compositions of this invention which have an atomic ratio of carbon to tungsten in the range from about 0.97 to slightly less than 1.0, it is especially important that there be present a minimum amount of oxygen and free carbon. Thus, when the dried milled mixture of tungsten carbide and cobalt contains over about 0.1 percent by weight of free carbon or more than about 0.5 percent by weight of oxygen, it is preferred to remove these impurities by treatment at a minimum elevated temperature in a reducing atmosphere.

Traces of oxygen as well as free carbon can be removed during this purification, and at the same time the combined carbon content can be adjusted, all by heating the powder in a stream of hydrogen containing a carefully regulated concentration of methane. The powder can be charged to shallow trays made from a high temperature alloy, such as Inconel, and the trays loaded directly from the inert atmosphere environment to a tube furnace also made from Inconel or some similar high temperature alloy.

The powder in a stream of the reducing gas is brought to a temperature ranging from 750° to 1000° C., depending on the metal content of the powder, in from three to five hours, taking half an hour to raise the temperature the last hundred degrees. For a cobalt content of about 1%, 1000° C. is used, and for powders containing 12% cobalt, the temperature is 800°–900° C.

The reducing gas should consist of a stream of hydrogen containing methane and about 10 percent of inert carrier gas such as argon. The proportions of methane to hydrogen are adjusted to provide a very slightly carburizing atmosphere at the temperature used, such that tungsten would be converted to tungsten carbide yet free carbon will be removed as methane. Thus, at 1000° C. the stream should contain 1 mole percent methane in hydrogen; at 900° C., 2 mole percent methane; and at 800° C., 4 mole percent methane in the hydrogen. The reduction/carburization at the maximum temperature is carried on for a period of 0.5 to 3 hours, and after cooling to room temperature under argon the powder is discharged to an inert atmosphere environment where it is screened through a seventy mesh screen. If desired this powder can be stored for extended periods in sealed containers or it can be used directly.

Samples for analysis should be taken without contact with oxygen or air and sealed in suitable vials. In view of their reactive surfaces, and the necessity to avoid contamination with oxygen, the powders are subsequently handled without contacting the atmosphere. The capacity of the powder to absorb oxygen is considerably reduced by the reduction-carburization step, especially when conducted at 900° C. or higher, and such powders which do not absorb more than 0.5% by weight of oxygen when exposed to air can usually thereafter be handled in the atmosphere.

Care must be employed to assure that in the reduction/carburization step an excess of methane is avoided so that no free carbon is introduced into the powder. It is to be noted that although the reaction conditions are such that tungsten metal would ordinarily be converted to tungsten carbide, nevertheless very finely divided tungsten carbide used in this invention remains slightly deficient in carbon and is not carburized completely to a stoichiometric ratio for WC. It can be calculated from the density of tungsten carbide and the molecular weight, that a tungsten carbide powder having a specific surface area of 5 square meters per gram will have about 2 percent of the tungsten atoms on the surface. It is thus possible that a relationship exists between the small particle size of the tungsten carbide of this invention and its deficiency in carbon. It may be that each tungsten atom on the surface of these fine tungsten carbide particles combines on the average with less than one atom of carbon. Hence the powder would contain slightly less than one atomic weight of carbon per atomic weight of tungsten.

For powders in which the desired atomic ratio of carbon to tungsten is less than about 0.97, and where oxygen is to be removed by the described reduction step, methane or other carburizing environment should be avoided and only hydrogen used.

Generally speaking, with powders of higher cobalt content, lower atomic ratios of carbon to tungsten may be employed.

Since the effect of the carbon deficiency is to allow tungsten to dissolve in the cobalt, the more cobalt binder in the composition, the more tungsten needed and the lower the atomic ratio of carbon to tungsten desired in the composition. Generally, the carbon deficiency is preferred to be such as to provide at least about 12% by weight of tungsten in solution in the cobalt phase.

However, the minimum atomic ratio of carbon to tungsten, $R_{min}$, is found to be $$R_{min} = 1.0 - 0.0062(P-1)$$

where P is percent by weight of cobalt.

An optimum ratio will be between the minimum and 1.0. Thus, for a powder containing 10% by weight of cobalt, for example, the minimum ratio is about 0.94 and excellent products are obtained with ratios ranging from 0.95 to more than 0.99. For a powder containing 30% cobalt, ratios of around 0.85 to 0.95 are preferred.

A preferred maximum ratio $R_{max}$ for most purposes is $$R_{max} = 1.0 - .00166(P-15)$$

where P is percent by weight of cobalt.

Interdispersion of finely divided cobalt and very finely divided carbon deficient powders of tungsten carbide can also be prepared by suitable mechanical blending, followed by heat treatment, as described below.

(2) Heat deactivation

One of the preferred embodiments of this invention is a cobalt/tungsten carbide powder in which the cobalt is alloyed with 8 to 25 percent by weight of tungsten, the tungsten carbide has a specific surface area of greater than 0.5 square meter per gram, but less than 3 square meters per gram and thus which is not highly reactive with the oxygen in the atmosphere.

Although powders which have been reduced at temperatures up to 1000° C. are considerably less reactive chemically, even they must be further heated to a somewhat higher temperature to deactivate them.

I have discovered that the homogeneously interspersed, carbon deficient, cobalt/tungsten carbide mixtures can be heat treated in an inert atmosphere or in hydrogen to deactivate them. The tungsten carbide in the powder mixture to be treated has a specific surface area of at least three square meters per gram; consists of crystallites or dense particles in the range from 10 to 1000 millimicrons in size; and contains from 0.8 to less than 1.0 atomic weight of combined carbon per atomic weight of tungsten. There should be present less free carbon than that required to raise the atomic ratio of carbon to tungsten to reach unity. Ordinarily free carbon content is maintained at less than 0.3%.

When this interspersed powder composition is heated as prescribed, irreversible changes occur which result in the formation of a material which can be consolidated to dense bodies of exceptional strength and unusual resistance to removal of the metal by acid. The greater strength and acid resistance is due to a change in the cobalt binder which occurs when the powders of this invention are heated to a critical temperature, namely the formation of a solid solution of tungsten in the cobalt phase. Such properties are not developed, however, unless the starting powder has the required characteristics recited above.

During the heating process, the powder composition is in the form of a loose mass of powder or powder which has undergone a preconsolidation step. The term "preconsolidation" is used herein to mean that the powder is consolidated before this heating step, to distinguish such compacting operation from the later consolidation step which is carried out at higher temperature to form dense compositions. During the heating step, the composition undergoes some sintering and the mass of powder, or preconsolidated powder, undergoes some shrinkage. Also in the range from 400° to 900° C. gases are evolved from the powder.

It is especially important that when the composition is being heated for the first time it should not be subjected to excessive pressure or mechanical constraint, especially when in a graphite or carbon container. Pressure can be applied providing it is not sufficient to keep the sintering billet in intimate contact with the graphite walls of the mold. With some powders, a pressure of up to 1000 p.s.i. can be applied during the heating step, since even under such pressure the billet shrinks away from the mold and is not seriously carburized. At this stage of the process excessive compression appears to cause irreparable harm. This may be caused either by shearing forces which disturb the internal structure of the composition at the beginning of recrystallization and sintering or it may be due to chemical effects from contact with material such as graphite which is ordinarily used to apply the pressure. Thus it has been observed that application of pressure to the composition while in an alumina mold is less harmful than when carbon molds are used, even using pressures higher than 1000 p.s.i. The harm also may be due to trapping of gases in pores that are collapsed by the pressure. In the absence of pressure such pores would not normally become closed during this sintering.

It is most surprising that if the composition is heated to the prescribed temperature it can thereafter be consolidated to density and molded by hot pressing in a carbon mold without absorbing undesirable amounts of carbon. I have found that after the tungsten has dissolved in the solid cobalt phase during the heat treatment it is much less readily carburized.

Heat treatment is carried out in an inert atmosphere. An inert atmosphere is one that does not react with the powder, such as argon, hydrogen or vacuum. Heat treatment is carried out at a temperature $T_s$ which is above 1000° C., but generally below the temperature, $T_h$, and the treatment lasts for from $t_s$ to $20 t_s$ minutes, where:

$$\log_{10} t_s = \frac{13250}{T_s + 273} - 8.2 \text{ minutes}$$

and $$T_h = \frac{6.5 - \log_{10}(P - 0.3)}{0.0039}$$

where $P$=percent by weight of metal in the composition.

Thus the composition is heated to temperature $T_s$ and held for a minimum of $t_s$ minutes. The maximum time of heating is not critical at temperatures below which no appreciable grain growth of tungsten carbide occurs, namely below about 1200° C. However, above 1200° C., the time should not exceed about $20 t_s$. For example, at 1000° C., it is necessary to heat for at least 2½ hours and preferably several times this long; at 1100° C. the composition is heated for at least 13 minutes; at 1200° C. the hold time is a minimum of about 5 minutes and not over two hours; at 1400° C. the hold time is less than 10 minutes, and at 1500° C. it is less than 4 minutes.

It is of course preferred to heat to a temperature $T_s$ intermediate between 1000° C. and $T_h$ and for a time that is convenient. Thus heating at around 1200° C. is preferred. However, the temperature $T_s$ that is selected and the rate of heating depends on the physical nature of the composition being heated. When the composition is a powder of finely pelleted material which is to be heated with minimum cohesion so that it can be used for subsequent molding, a slow heating rate such as 100° C. per hour to 900° C. and then 50° per hour to 1150° C. and a minimum heating temperature is preferred. In such instances an extended heating period is acceptable as the transfer of tungsten into the cobalt phase must be effected at as low a temperature as possible to avoid sintering the powder and to avoid formation of eta phase. On the other hand, if a preconsolidated composition is employed, it can be heated more rapidly and to higher temperature, requiring a shorter hold time.

When a powder which has not been heat-treated is pressed in a graphite mold by applying pressure above 1000 p.s.i. at 1000° C. and continuing the application of pressure while the temperature is raised to 1400° C., and then cooled rapidly, the dense body produced is no stronger or more resistant to acid than conventional tungsten carbide bodies of similar metal content. It has become carburized. However, if the powder is first heat-treated as described above, and then molded in the above way, a very strong acid-resistant product is obtained. Such a product has not become carburized during the pressing operation.

Heat-treatment of conventional powders of tungsten carbide and cobalt which fall outside of the limits prescribed by this invention such as particle size or carbon content, does not impart to such powders any advantage over the same materials lacking heat treatment and when heat-treated conventional powders are densified, only conventional properties are obtained.

It should be noted that the temperatures and times required to bring about the irreversible change in the compositions of this invention vary to some extent with the size of samples, dimensions of equipment, heating rates attainable and the like. For example, it is possible to carry out the heating step either on loose powder or pre-consolidated powder while it is being heated to the temperature at which it is to be finally consolidated. Such heating should be carried out rapidly in the range above 1200° C., providing the sample is heated relatively uniformly throughout its volume. An integrated combination of temperatures and times equivalent to the fixed times and temperatures described, is in keeping with the spirit of the invention, and will be apparent to those skilled in the art.

As mentioned above, one of the preferred products of the invention is a heat-treated powder which can be used to prepare strong acid-resistant bodies. The inter-dispersed tungsten carbide and metal compositions previously defined as being suitable for the heat-treating step, are prepared preferably as a fine powder of uniform size, especially as spherical aggregates of from 20 to 200 microns in diameter. Such a powder, preferably containing from 1 to 15% by weight of cobalt, is subjected to the prescribed heat-treating step under the specified conditions to bring about the above-described irreversible change, involving dissolution of tungsten into the solid cobalt phase. Using a powder which has already been reduced at 900° C. as previously described, further heating at a temperature such as 1100 to 1200° C. and a heating time of about an hour is sufficient to produce a composition which, although partially sintered, can still be broken apart to the original particles and which can be hot pressed to produce very strong bodies with a suitable low ratio of carbon to tungsten. A slow heating rate from 900 to 1150° C. and further heating for several hours at 1150° C. gives a free-flowing powder in which the spherical aggregates are individually sintered but not stuck together.

Heat treatment reduces the surface area of the powder to less than 5 square meters per gram and preferably less than 3 square meters per gram. This makes the powders less susceptible to oxidation on exposure to the atmosphere, because the lower the surface area the less reactive the powder. However the powder should not be heated too long nor too high a temperature because a highly sintered product would be obtained which is difficult to break up into a powder and hard to use. The surface area of the powders of this invention is greater than 0.1 square meter per gram and preferably greater than 0.5 square meter per gram.

Such powders are one of the preferred embodiments of this invention as they can be employed to produce large billets of cobalt-bonded tungsten carbide of very high strength. One of the preferred embodiments of this invention is such a powder which contains from 3 to 15 percent by weight of cobalt alloyed with from 15 to 25 percent by weight of tungsten based on the weight of cobalt, and which has a specific surface area for the tungsten carbide of greater than 1 square meter per gram. The tungsten carbide crystals in a heat treated powder are triangular platelets when the starting powder is the most preferred starting powder described above.

Once the powder has been heat-treated it is partially sintered and is particularly insensitive to condition variables such as the rate of heating, or the temperature at which pressure is applied. Thus when densifying the powders, the pressure can generally be applied to the powder in the mold at 1000° C. of 1100° C. and maintained throughout the heating period. However, it is important that the time at the maximum temperature $T_m$ be limited as will be later described, in order to avoid grain growth.

The heat treated powder can of course be mixed with conventional cobalt/tungsten carbide powders commonly used in the art. Such a mixture, when consolidated to a dense body, will demonstrate improved properties to the extent that the composition is made up of a powder of this invention.

The heat-treated powders of the invention are very stable and can be exposed to the atmosphere or stored for extended periods of time. They can be applied to surfaces to form wear resisting coatings by such methods as flame spraying or with the plasma torch.

METHODS OF CHARACTERIZATION

(1) Chemical analysis

The chemical composition of the powders of this invention can be determined by conventional chemical analysis for the elementary constituents. In addition, uncombined carbon can be determined by the procedure described for the aggregated colloidal tungsten carbide powders in my application Ser No. 660,986, referred to above.

The determination of oxygen content can be made with an Oxygen Analyzer, such as LECO No. 534–300, supplied by the Laboratory Equipment Corporation.

Analysis for tungsten can be made by completely oxidizing the sample, heating it in air, and fusing the mixed oxide residue with potassium nitrate. Tungsten is separated by precipitation with cinchonine reagent, from a solution of the fusion product and determined gravimetrically by ignition of the organic complex to tungstic oxide.

Analysis for cobalt can be made such as by oxidizing the sample, as above, and fusing the oxide residue with potassium pyrosulfate. A solution of the fusion product is made basic with sodium carbonate, to precipitate cobalt hydroxide. The hydroxide is filtered, dissolved in hydrochloric acid and the cobalt determined by addition of an excess of ethylenediamine tetraacetic acid and back titration of the excess with standard zinc acetate solution, using xylenol orange as the indicator.

(2) Examination with optical microscope

To examine homogeneity of the powders and detect coarse grains the powders can be examined quite satisfactorily at magnification up to 2000X with the light microscope.

Optical micrographs prepared at magnifications of 1000X to 2000X are most useful in detecting the size, distribution and shape of the tungsten carbide particles larger than a few microns. Optical micrographs enable anisodimensional particles to be identified.

More detailed examination and characterization of submicron size particles in the powders requires observation with the electron microscope.

(3) Examination with electron microscope

Because of the unusually fine particle size of the powders of this invention, it is often advantageous to use the electron microscope to measure the particle size. The procedures employed will be readily apparent to one skilled in the art.

(4) Tungsten content of the cobalt

A preferred method for measuring the tungsten content of the cobalt is to remove the tungsten carbide by anodic etching in potassium hydroxide-potassium ferricyanide solution and then examine the cobalt alloy by X-ray diffraction to determine the lattice constant of the cobalt. The percentage of tungsten in the cobalt is calculated, based on the information given in "Handbook of Lattice Spacings and Structure of Metals," vol. 1 page 528, Pergamon Press, 1958, by W. B. Pearson. When no tungsten is present, the lattice constant of cubic cobalt is 3,545 Angstroms, and when the initial binder contains 21% by weight of tungsten and 79% by weight of cobalt in solid solution, the lattice constant is 3.570.

I have found that the cobalt alloy phase can be isolated from the powder mixture by anodically etching the tungsten carbide at a current density of 3 amperes per square inch in a solution containing 10% by weight of potassium ferricyanide and 10% by weight of potassium for 24 hours and then rinsing the cobalt alloy in water and drying it at 60° C. under nitrogen. The tungsten content, determined by X-ray diffraction from powder patterns, corresponds with the limit of error to the ratio of weights of tungsten to tungsten plus cobalt, determined by chemical analysis, providing no substantially quantity of $Co_3W$ or carbide phases are present. In this recovered metal phase, tungsten carbide and cobalt-tungsten carbide phases such as eta, $Co_3W_3C$ are determined by heating the sample in 35% hydrochloric acid at 80° C. for one hour, filtering and weighing the washed and dried insoluble residue which will contain the said carbides which are insoluble. If the intermetallic compound $Co_3W$ is present, it will dissolve in the acid; it is seldom present in the powder mixtures of this invention.

Utility

The mixed cobalt/tungsten carbide powders of this invention are useful in preparing dense cobalt-bonded tungsten carbide bodies possessing outstanding physical and performance properties. Such dense bodies are advantageously employed as cutting tools, dies, thread-guides and chemical-resistant refractory parts.

The powders of this invention are also useful as wear-resistant coatings which can be applied by such methods as flame spraying or with a plasma torch. The powders of this invention, their preparation and use are more fully illustrated in the following example wherein parts and percentages are by weight unless otherwise noted.

EXAMPLE 1

Twenty-two thousand seven hundred parts of calcium chloride are melted and brought to 985° C. in a carbon crucible, maintaining an atmosphere of argon in the system. To the melt, continuously agitated with a carbon stirrer, are added, simultaneously through separate hoppers attached to the head of the reactor, charges of (a) 243 parts of a blended mixture consisting of 230 parts of tungstic oxide and 13 parts of carbon having specific surface areas of 5 and 340 square meters per gram, respectively prefired for 4 hours at 750° C. under argon to remove water, and (b) 120 parts of pure granulated calcium metal. The charging hoppers are fitted with a double valve system, to exclude the atmosphere when introducing the reactants. Twenty additions of each of the materials (a) and (b) are charged at 3 to 4 minute intervals over a period of 1.5 hours, the temperature being maintained in the range between 990–1000° C. After the addition of all the reactants, the melt is maintained at temperature, with stirring, for a further twenty minutes, and is then drained from the carbon crucible into an Inconel bucket, maintaining an atmosphere of argon throughout, and allowed to solidify and cool. The solid cake, which has contracted away from the walls of the bucket, is removed and divided into two portions. The dark layer at the bottom of the solid cake is rich in tungsten carbide, whereas the upper, lighter gray portion is low in tungsten carbide, and contains considerable amounts of free carbon and oxide. The lower portion of the solid cake is broken into coarse pieces which are charged to a polyethylene tank and 23,000 parts of water are then added. The pieces of salt cake are leached by continuously agitating the water in the tank and adding ice as necessary to keep the temperature below 85° C. When the initial temperature rise due to hydration is complete, concentrated hydrochloric acid is added in 1200 part increments. As the cake disintegrates, dissolves, and reacts, the pH decreases from strongly basic to acidic values. Because of the high salt concentration in the slurry, actual pH values are higher than those which are measured. Sufficient acid is added to lower the pH to slightly less than one. When a pH of one is achieved and maintained, with continuous agitation, for 15 minutes, the stirring is discontinued and the salts are allowed to settle. The supernatant liquid is siphoned off and the sludge washed through a 100 mesh screen into a second polyethylene tank. Material retained on the screen is discarded and the sludge is diluted to about 38,000 parts with distilled water having a pH between 6 and 7 and a specific resistivity greater than 100,000 ohms per centimeter, and the resultant slurry is agitated for 15 minutes. More hydrochloric acid is then added until the pH is finally stabilized at 3, in the well-stirred slurry. The washing of the sludge with acetone is repeated three settle and the supernatant liquid is siphoned off, as before. The washing operation is repeated until the specific resistivity of the stirred slurry is between 2500 and 5000 ohms per centimeter, which requires five washings. After removing the final supernatant liquid, the aqueous sludge is diluted with an equal volume of acetone, the solids are allowed to settle, and the supernatant liquid is decanted. The washing of the sludge with acetone is repeated three times. The acetone-rinsed sludge is transferred to shallow metal trays and the acetone is evaporated in a vacuum oven using a purge of pure nitrogen. After the bulk of the acetone is evaporated, the trays are heated to 80° C. to completely dry the powder. The oven is cooled to 40° C., filled with nitrogen, and the dried product is removed and screened through a 100 mesh sieve. Three thousand two hundred fifty parts of tungsten carbide powder are recovered, corresponding to an overall yield of 84% of theoretical.

By analysis this powder contains 93.5% tungsten, 6.05% total carbon, less than 0.1% free carbon and 0.3% oxygen.

The product gives the X-ray diffraction pattern of tungsten carbide and from the broadening of the X-ray lines, the average crystallite size is calculated to be 31 millimicrons. The specific surface area is 7.1 square meters/gram.

Electron microscopic examination of the powder shows it to consist of porous aggregates of colloidal crystallites in the size range 20 to 50 millimicrons. The aggregates are mainly in the size range of from 1 to 10 microns, although some aggregates as large as 50 microns can be observed.

This material will hereafter be referred to as aggregated colloidal tungsten carbide powder.

Incorporation of cobalt is accomplished by milling the metal in powder form with tungsten carbide powder. To an 8 inch diameter, 1 gallon steel mill the following are charged: (a) 14,000 parts of "Carboloy" grade 883 cobalt bonded tungsten carbide rods, ¼ inch in diameter, and ¼ inch long, the rods being previously conditioned by tumbling for two weeks; (b) fifteen hundred parts of the aggregated colloidal tungsten carbide powder prepared above; (c) 205 parts of Cobalt F, a fine cobalt powder having a specific surface area of 0.7 square meter per gram and a grain size of about 1 micron; and (d) 1185 parts of acetone. This charge occupies about ½ the volume of the mill. Milling under acetone is continued for 7 days by rotating the mill at 45 revolutions per minute, after which time the mill lid is replaced by a discharge cover and the contents are transferred to a container under a nitrogen atmosphere. Three portions of acetone of 395 parts each are used to wash out the mill. The solids in the drying flask are allowed to settle and the bulk of the acetone is siphoned off. The flask is then evacuated and when the bulk of the acetone is evaporated, the temperature of the flask is brought to 125° C., maintaining a vacuum of less than a tenth of a millimeter of mercury. After about 4 hours, the flask is cooled, filled with pure argon and transferred to an argon glove box. In this inert environment the solids are removed from the drying flask and screened through a 70 mesh sieve.

As an alternative, the mill lid may be replaced by a cover attached to a vacuum system with condensing trap and the acetone is removed under vacuum at a temperature of about 95 to 100° C. maintained on the mill walls by live steam. After the acetone has been removed, as indicated by a vacuum of 0.1 millimeter of mercury maintained in the mill, the mill is filled with nitrogen, the milled powder is recovered from the milling medium and removed under a nitrogen atmosphere. The powder is then screened under nitrogen as before.

The analysis of this unreduced powder mixture indicates that there is present 12.0% cobalt, 0.2% free carbon, and 5.45% total carbon of which some is due to adsorbed organic matter; the specific surface area is 5.5 square meters per gram; and the oxygen content is 0.45% by weight.

The screened powder is charged to shallow trays which are then loaded directly from the argon filled box to a five inch diameter tube furnace, where the powder is brought to 900° C. at a uniform rate in about 3 hours. The gas passing through the furnace consists of hydrogen, at a flow-rate of four liters per minute, with methane introduced at a flow-rate of forty milliliters per minute. The methane is present to minimize excessive decarburization of the tungsten carbide by the hydrogen. The powder is held in this gas stream at 900° C. for two hours, the temperature is then increased to 1250° C. over a period of five hours and argon is substituted for hydrogen and methane in the furnace atmosphere. The powder is heated under argon at 1250° C. for one hour. The powder is then cooled under argon to 200° C. and is discharged from the trays in a nitrogen filled glove-box. The powder contains some slightly sintered friable lumps but is readily screened through a 40 mesh screen to give a free-flowing powder which readily fills molds used in preparation of complex shapes.

The cobalt-containing tungsten carbide powder is characterized by analysis as follows: tungsten 82.3%; total carbon 5.33%; free carbon less than 0.1%; cobalt 12.1%; oxygen 0.26%. The carbon content found by analysis corresponds to an atomic weight of carbon of 0.99 per atomic weight of tungsten. The cobalt phase is separated from the tungsten carbide by anodic oxidation of a thin layer of powder in alkaline potassium ferricyanide. It is then analyzed for tungsten and is found to contain 18%. The specific surface area is 2.6 square meters per gram.

EXAMPLE 2

To a steel mill are charged 14,000 parts of "Carboloy" grade 883 cobalt-bonded tungsten carbide rods, previously conditioned as described in Example 1, 1800 parts of a fine commercial tungsten carbide powder and 1450 parts of acetone.

The tungsten carbide powder has a nitrogen surface area of 0.66 m.$^2$/gram which corresponds to an average particle size of 580 millimicrons. By X-ray line broadening the average crystallite size is 370 millimicrons. Examination of the powder with an electron microscope reveals dense aggregates in the size range of from 2 to 10 microns, the aggregates being comprised of rough-surfaced particles in the size range of from 0.5 to 2 microns. Chemical analysis of this powder gives the following percentages: tungsten 93.2%; total carbon 6.32%; oxygen and free carbon, less than 0.1%.

Milling under acetone is continued for 7 days, as described in Example 1. One hundred eighty parts of fine cobalt powder are then added to the mill, maintaining an atmosphere of nitrogen in the mill while this is being done, and milling is continued for a further 7 days, the mill being then discharged and the dry powder product recovered and screened through a 70 mesh sieve without exposure to the atmosphere, as described in Example 1.

Prior to adding the cobalt, a small sample of the tungsten carbide-acetone slurry is removed and the dry powder is recovered without exposure to the atmosphere. The nitrogen surface area of this powder is 5.0 m.$^2$/gram, corresponding to an average particle size of 75 millimicrons. By X-ray line broadening the average crystallite size is 50 millimicrons. By electron microscope the powder is seen to be a mixture of very fine particles, in the size range of 25 to 50 millimicrons, together with coarser fragments, in the size range of about 250 to 3000 millimicrons. 95% of the particles are less than one micron in size.

Removal of the cobalt from the milled dried cobalt-tungsten carbide composition, by dissolution in hydrochloric acid, and recovery of the tungsten carbide component, taking precautions to avoid contact with the atmosphere, gives a powder having a nitrogen surface area of 5.7 m.$^2$/gram and an X-ray line broadening crystallite size of 32 millimicrons. This shows that only a small reduction in particle size results from milling the premilled tungsten carbide powder in the presence of cobalt.

The dried screened cobalt-tungsten carbide powder is heated at 900° C. for two hours in an atmosphere of hydrogen containing a small amount of methane, and then at 1300° C. for 30 minutes under argon as described in Example 1, and the resulting powder is discharged under nitrogen and is crushed and screened as before.

The cobalt-containing tungsten carbide powder is characterized by analysis as follows: tungsten 85.7%; total carbon 5.53%; cobalt 8.5%; oxygen and free carbon less than 0.05%. The carbon content found by analysis corresponds to an atomic weight of carbon of 0.99 per atomic weight of tungsten, and the cobalt alloy contains 19% of tungsten. The nitrogen surface area is 1.3 square meters/gram.

EXAMPLE 3

Eighteen hundred parts of aggregated colloidal tungsten carbide, prepared as in Example 1, 56 parts of fine cobalt powder, and 1450 parts of acetone are charged to a steel mill containing 14,000 parts of the cobalt-bonded tungsten carbide rods described in Example 1. The charge is milled for 7 days and the product is recovered, dried, screened through a 70 mesh screen, reduced in a hydrogen-methane stream, and heated at 1400° C. for ten minutes as described in Example 1. The resulting powder is then discharged under nitrogen, and is crushed and screened as before.

The powder, consisting of free flowing granules, is analyzed and contains 2.9% cobalt and less than 0.02% oxygen and free carbon. The carbon content corresponds to a carbon:tungsten ratio of 0.99. The cobalt alloy contains 24% tungsten and the surface area of the powder is 2.1 square meters per gram as determined by nitrogen adsorption.

EXAMPLE 4

Four hundred parts of aggregated colloidal tungsten carbide prepared as described in Example 1, 170 parts of fine cobalt powder and 373 parts of acetone are charged to a one quart steel mill containing 3500 parts of the cemented carbide grinding cylinders used in Example 1. The charge is milled for seven days and the cobalt-tungsten carbide composition is recovered, dried, reduced at 900° C. and heated at 1050° C. for 12 hours as described in Example 1.

The powder screens readily through a 70 mesh screen and upon analysis is found to contain: tungsten—66.5%; total carbon—4.26%; free carbon less than 0.1%; cobalt—29.3%; oxygen—0.08%. The cobalt alloy contains 8% tungsten alloy with the cobalt. The specific surface area is 1.6 square meters/gram.

EXAMPLE 5

A tungsten carbide cobalt powder containing about 12% cobalt is prepared by the procedure of Example 1 up to and including drying the powder after recovery from the ball milling operation, and screening under nitrogen.

Sixty parts of this unreduced powder is loaded into a cylindrical carbon mold, and close fitting carbon pistons are inserted in each end. The mold containing the powder is pressed at 200 p.s.i. and is then transferred to a vacuum hot press. After evacuation, the sample is heated to 400° C. and held for 15 minutes to allow gases to come off and the temperature is then raised to 1100° C., and the sample is held at this temperature with no application of pressure for 30 minutes.

At this point a rapidly cooled sample in the form of a free flowing powder is found to contain 11.5% of cobalt which in turn contains 15 percent by weight of tungsten in solid solution in the cobalt. The surface area of the powder is 2.7 square meters/gram.

EXAMPLE 6

An interdispersed powder of tungsten, tungsten carbide and cobalt is prepared by ballmilling as in Example 1, using 1380 parts of the aggregated colloidal tungsten carbide of Example 1, 205 parts of fine cobalt powder, 125 parts of finely divided tungsten metal powder having a grain size of one micron, and 1185 parts of acetone. After 7 days milling the interdispersed powder is recovered and screened through a screen of 70 meshes per inch, out of contact with the atmosphere and moisture. Because of the added tungsten, the atomic ratio of carbon to tungsten is 0.92. The powder is reduced in an atmosphere of hydrogen without addition of methane by heating it at a uniform rate in about 3 hours from 30° to 900° C., while passing over it a mixture containing 85% hydrogen and 15% argon. The powder is held at 900° C. for 2 hours, and then heated at a uniform rate from 900° C. to 1150° C., over a period of 5 hours. It is held at this temperature for 6 hours, and then cooled from 1150° C. to 700° C. in about 90 minutes, and then at a somewhat slower rate to ordinary temperature. The powder is discharged and screened as in Example 1.

This powder is found to contain 11.8% cobalt and the cobalt contains 23% by weight of tungsten. The surface area of the powder is 0.8 square meter/gram.

EXAMPLE 7

A commercially available milled mixture containing 91% tungsten carbide and 9% by weight of cobalt is used in this example. Chemical analysis of the powder indicates 5.7% total carbon, 9.2% cobalt, 0.13% oxygen, and 0.12% free carbon. The atomic ratio of carbon to tungsten in this powder is 1.0, and the specific surface area is 1.2 square meters/gram, as determined by nitrogen adsorption.

This powder is ballmilled for 7 days, is then dried and screened through a 70 mesh screen, is reduced in a hydrogen-methane stream, and is then heated at 1200° C. for 6 hours as described in Example 1. The resulting powder is slightly sintered but friable and is crushed and screened as in Example 1.

The powder is analyzed and found to contain 8.9% of cobalt which in turn contains 19% tungsten. The surface area is 0.6 square meter/gram as determined by nitrogen adsorption.

EXAMPLE 8

A powder consisting of 12 parts by weight of cobalt and 88 parts by weight of tungsten carbide is prepared as described in Example 1 up to the point where the dried product is recovered after milling. The vacuum dried material is screened under nitrogen, using a 70 mesh screen vibrated mechanically, and it is further hand screened through a 40 mesh screen to break up clumps which tend to form in the collecting pan on the vibrated screen. The powder is aggregated in the form of soft spheres a few hundred microns in diameter.

The screened powder is poured loosely into shallow trays which are then loaded to a 5 inch diameter Inconel tube furnace, the powder being handled throughout under a protective nitrogen atmosphere. The furnace is at 400° C. when the powder is loaded and the gas passing through the furnace consists of hydrogen, at a flow rate of 4 liters per minute, with methane introduced at a flow rate of 40 milliliters per minute, together with argon at a flow rate of about 700 milliliters per minute. The furnace is slowly brought to a temperature of 1150° C., using the heating cycle as follows: 400 to 900° C. in 2 hours, 900 to 1000° C. in 1½ hours, 1000 to 1150° C. in 3½ hours. The powder is then held at 1150° C. for 9 hours, but during the last seven hours only argon passes through the furnace. The furnace is then cooled from 1150° C. to 800° C. in one hour, the powder being in an atmosphere of argon during the cooling cycle. The trays containing the powder are then moved into a water-cooled zone outside the furnace and cooled rapidly from 800° to 300° C. in 15 minutes. The powder is discharged into a nitrogen filled box and it is transferred from the trays and screened through a 40 mesh screen. The powder consists of hard, sintered, free-flowing spheres a few hundred microns in diameter. It is characterized by analysis as follows: total carbon—5.31%; free carbon—less than 0.1%; oxygen—0.02%; cobalt—12.65%. The specific surface area is 0.2 square meter/gram. The carbon content found by analysis corresponds to an atomic weight of carbon of 0.99 per atomic weight of tungsten. The cobalt phase separated from the tungsten carbide by anodic oxidation of a thin layer of powder in alkaline potassium ferricyanide is found by analysis to contain 12% tungsten in solid solution. The powder has been sintered to a relatively hard, impervious condition, as indicated by the low specific surface area and low oxygen content.

EXAMPLE 9

A commercial tungsten carbide powder is milled to reduce its particle size and increase its specific surface area to greater than 2 square meters/gram. Two percent by weight of tungsten is added to provide tungsten to be dissolved in the cobalt binder phase, along with finely divided cobalt powder.

The fine commercial tungsten carbide powder is that used in Example 2, having a particle size of about a micron and a specific surface area of 0.66 square meter/gram. To a steel mill and carbide grinding medium as described in Example 1 are charged 1470 parts of the commercial tungsten carbide and 1185 parts of acetone. The carbide is milled for 48 hours. Then 30 parts of one micron tungsten powder and 205 parts of fine cobalt powder are added to the mill and the milling is continued for 72 hours. The milled powder is then removed from the mill and is dried and screened in an inert atmosphere. It is then charged to shallow trays and is heated in a vacuum furnace to 1200° C. over a period of 6 hours and is held under these conditions for an additional 4 hours. The powder is then cooled to room temperature under argon and is analyzed. It is found to contain an atomic ratio of carbon:tungsten of 0.96 and there is 30% tungsten in the cobalt. The surface area is 0.5 meter/gram as determined by nitrogen adsorption.

I claim:

1. A powder mixture consisting essentially of a cobalt alloy and tungsten carbide having a specific surface area greater than 0.1 square meter per gram, the cobalt is an alloy of tungsten containing from 8 to 33 percent by weight of tungsten, and the powder mixture contains from 1 to 30 percent by weight of the cobalt alloy.

2. A powder mixture of claim 1 in which the cobalt alloy contains from 8 to 25 percent by weight of tungsten.

3. A powder mixture of claim 1 which contains from 3 to 15 percent by weight of cobalt alloy.

4. A powder mixture of claim 3 which has a specific surface area greater than 0.5 square meter per gram.

5. A powder mixture of claim 4 in which the cobalt alloy contains from 8 to 25 percent by weight of tungsten.

6. A powder mixture of claim 1 which contains from 1 to 3 percent by weight of cobalt alloy.

7. A powder mixture of claim 1 which contains from 15 to 30 percent by weight of cobalt alloy.

8. A powder mixture of claim 1 which contains from 9 to 12 percent by weight of cobalt alloy.

9. A powder mixture of claim 8 in which the cobalt alloy contains from 8 to 25 percent by weight of tungsten.

10. A cobalt alloy/tungsten carbide powder mixture consisting essentially of tungsten carbide and from 1 to 30 percent by weight of cobalt alloy, the powder mixture having a specific surface area greater than 0.1 square meter per gram prepared by heating in an inert atmosphere a homogeneous mixture of
- (a) tungsten carbide powder having a particle size of from 10 to 1000 millimicrons and a specific surface area of 3 to 15 square meters per gram; and
- (b) cobalt powder;

at a temperature $T_s$, between 1000° C. and $T_h$° C. for from $t_s$ to $20t_s$ minutes where $$\log_{10} t_s = \frac{13250}{T_s + 273} - 8.2$$

and $$T_h = \frac{6.5 - \log_{10}(P-0.3)}{0.0039}$$

where $P$=percent by weight of cobalt.

11. A powder of claim 10 which contains from 3 to 15 percent by weight of cobalt alloy.

12. A powder of claim 11 which has a specific surface area greater than 0.5 square meter per gram.

13. A powder of claim 10 which contains from 0.81 to less than 1.0 atomic weight of carbon per atomic weight of tungsten and which was prepared from a homogeneous mixture of cobalt powder and tungsten carbide powder in which the tungsten carbide had a particle zine of from 10 to 1000 millimicrons and a specific surface area greater than 1 square meter per gram.

14. A cobalt alloy/tungsten carbide powder consisting essentially of tungsten carbide and from 1 to 30 percent by weight of cobalt alloy, said powder containing less than 1 percent by weight of oxygen and from 0.81 to less than 1.0 atomic weight of carbon per atomic weight of tungsten, prepared by crushing a mixture of tungsten carbide and cobalt which has been sintered at a temperature T between 1000° C. and 1400° C. for from $t_s$ to $20t_s$ minutes where $$\log_{10} t_s = \frac{13250}{T + 273} - 8.2$$

15. A powder of claim 14 which contains from 1 to 15 percent by weight of cobalt alloy.

16. A powder of claim 14 in which the sintering temperature is between 1000° C. and 1200° C.

References Cited

UNITED STATES PATENTS

| | | | |
|---|---|---|---|
| 387,745 | 12/1907 | Haynes | 75—171 |
| 1,057,423 | 4/1913 | Haynes | 75—171 |
| 1,338,133 | 4/1920 | Honda | 75—171 |
| 1,910,884 | 11/1931 | Comstock | 75—.5 |
| 1,951,133 | 3/1934 | De Bats | 23—208 |
| 1,998,609 | 4/1935 | Comstock | 75—204 |
| 2,011,369 | 8/1935 | McKenna | 29—182.8 |
| 2,113,171 | 4/1938 | Cooper | 29—182.8 |
| 2,116,399 | 5/1938 | Marth | 75—204 |
| 2,122,403 | 7/1938 | Balke et al. | 29—182.7 |
| 2,731,711 | 1/1956 | Lucas | 29—182.8 |

FOREIGN PATENTS

| | | |
|---|---|---|
| 1,041,958 | 9/1966 | Great Britain. |

OTHER REFERENCES

Metals Handbook, 1948 edition, American Society for Metals, Novelty Park, Ohio, p. 63.

BENJAMIN R. PADGETT, Primary Examiner

A. J. STEINER, Assistant Examiner

U.S. Cl. X.R.

29—182.8; 75—204